United States Patent [19]

Shalati et al.

[11] Patent Number: 5,227,243

[45] Date of Patent: Jul. 13, 1993

[54] HYDROXY ADDITION POLYMER, ANHYDRIDE ADDITION POLYMER AND CYCLOALIPHATIC POLYEPOXIDE

[75] Inventors: Mohamad D. Shalati, Richton; James A. Marquart, Chicago Heights; John R. Babjak, Tinley Park; Rodney M. Harris, Chicago, all of Ill.

[73] Assignee: The Sherwin-Williams Company, Cleveland, Ohio

[21] Appl. No.: 657,008

[22] Filed: Feb. 19, 1991

Related U.S. Application Data

[63] Continuation of Ser. No. 120,887, Nov. 16, 1987, abandoned, which is a continuation-in-part of Ser. No. 840,117, Mar. 14, 1986, abandoned.

[51] Int. Cl.$^5$ .................... B32B 15/08; C08L 33/02; C08L 63/00
[52] U.S. Cl. .................... 428/457; 428/375; 428/394; 428/423.3; 428/423.7; 428/424.2; 428/424.4; 428/424.6; 428/424.7; 428/425.6; 428/425.8; 428/430; 428/441; 428/442; 428/458; 428/461; 428/463; 525/108; 525/111; 525/112; 525/114; 525/117; 525/118; 525/438; 525/450; 525/454

[58] Field of Search ............... 525/108, 111, 112, 114, 525/119, 108, 111, 112, 114, 117, 118, 438, 450, 454; 428/413, 414, 416, 418, 375, 394, 423.3, 423.7, 424.2, 424.4, 424.6, 424.7, 425.6, 425.8, 430, 441, 442, 457, 458, 461, 463

[56] References Cited

U.S. PATENT DOCUMENTS 4,620,994  11/1986  Suss et al. .................... 427/407.1

FOREIGN PATENT DOCUMENTS 0123793  11/1984  European Pat. Off. .
0134691  3/1985  European Pat. Off. .

*Primary Examiner*—Robert E. Sellers
*Attorney, Agent, or Firm*—Robert E. McDonald

[57] ABSTRACT

Coating compositions which comprise: (i) a hydroxy-functional compound containing in the molecule an average of at least two hydroxyl groups; (ii) an anhydride-functional compound containing in the molecule an average of at least two cyclic carboxylic acid anhydride groups; and (iii) an epoxy-functional compound containing in the molecule an average of at least two cycloaliphatic epoxy groups, provide low temperature cure response and excellent durability.

3 Claims, No Drawings of 5,227,243

HYDROXY ADDITION POLYMER, ANHYDRIDE ADDITION POLYMER AND CYCLOALIPHATIC POLYEPOXIDE

CROSS-REFERENCE TO RELATED APPLICATIONS

This is a continuation of copending application Ser. No. 07/120,887 filed Nov. 16, 1987, abandoned, which applications is a continuation-in-part of prior application Ser. No. 06/840,117, filed Mar. 14, 1986, now abandoned.

BACKGROUND OF THE INVENTION

1. Field of the Invention

This invention relates to novel reactive coatings which can be cured at room temperature or force dried at temperatures ranging up to about 350° F. The coatings may be utilized as primers, topcoats or as clearcoats and/or basecoats in clearcoat/basecoat compositions. The combination of hydroxy-functional compounds, anhydride-functional compounds, and epoxy-functional compounds, especially cycloaliphatic epoxy compounds, provides fast reacting, durable coatings which minimize the toxicity problems which may be associated with other low temperature curing systems.

2. Description of the Prior Art

One approach to high performance low temperature curing coatings has involved two component coatings comprising reactive isocyanates and active hydrogen containing compounds such as hydroxyl containing polymers or amine containing polymers to produce urethane or urea coatings. Although these materials have excellent performance and cure at low temperatures, the isocyanates may, under some conditions, be relatively hazardous to handle.

Coating compositions comprising reactive combinations of epoxy containing compounds and compounds having acid or amine functionality are known in the art. Similarly, coating compositions comprising cyclic anhydrides and hydroxy-functional compounds are also known in the art. The prior art has not, however, taught the combination of anhydride-functional compounds, epoxy-functional compounds, and hydroxy-functional compounds to provide low temperature curing coatings having excellent durability and performance.

BRIEF SUMMARY OF THE INVENTION

This invention involves a curable composition which comprises: (i) a hydroxy-functional compound having an average of at least two hydroxyl groups per molecule; (ii) an anhydride-functional compound having an average of at least two cyclic carboxylic acid anhydride groups per molecule; and (iii) an epoxy-functional compound having an average of at least one and, preferably, at least two epoxy groups per molecule. At least one of the compounds (i), (ii), or (iii) should comprise a film forming polymer. The term "compound" is used in its broadest sense to include monomers, oligomers, and polymers. The term "film forming polymer" means any polymeric material that can form a film from evaporation of any carrier or solvent.

In its most preferred formulation, this invention relates to curable compositions wherein the hydroxy-functional compound is a polymer prepared by the free radical addition polymerization of one or more monomers, at least one of which contains or can be reacted to produce a reactive hydroxyl group; and wherein the anhydride-functional compound is the addition polymerization product of at least one unsaturated monomer having anhydride functionality, especially maleic anhydride, and at least one other ethylenically unsaturated monomer; and wherein the epoxy-functional compound is a cycloaliphatic epoxy compound.

It is especially preferred to utilize the curable composition of this invention in combination with from about 5 to about 80%, and especially 5 to about 50%, by weight of an inert solvent, such as ketones, esters, and aromatic or aliphatic hydrocarbons. It is convenient to provide the coating composition as a two-component system wherein the anhydride-functional compound provides one package and the hydroxy-functional compound and the epoxy-functional compound provide a second package. The two components can be mixed prior to application to provide the curable coatings.

In one preferred application, this invention relates to coated substrates having a multi-layer decorative and/or protective coating which comprises:

(a) a basecoat comprising a pigmented film-forming polymer; and (b) a transparent clearcoat comprising a film-forming polymer applied to the surface of the basecoat composition;

wherein the clearcoat and/or the basecoat comprises the curable compositions of this invention.

Accordingly, it is an object of this invention to provide improved curable compositions having excellent reactivity at low temperatures. It is a further object of this invention to provide coating compositions which may be utilized as primers, topcoats or clearcoats and/or basecoats in clearcoat/basecoat compositions. Another object of this invention is to provide an improved two-component coating composition wherein one component comprises an anhydride-functional compound and the other component comprises a hydroxy-functional compound and an epoxy-functional compound. Another object of this invention is to provide coatings having excellent exterior durability and corrosion resistance. A further object of this invention is to provide improved coating compositions which can be cured at room temperature or force dried at elevated temperatures. These and other objects of the invention will become apparent from the following discussions.

DETAILED DESCRIPTION OF THE INVENTION

1. HYDROXY-FUNCTIONAL COMPOUNDS

The hydroxy-functional compounds which are useful in the practice of this invention have an average of at least two hydroxyl groups per molecule. Although low molecular weight diols and polyols such as propylene glycol, 1,6-hexanediol triethanol amine, and pentaerythritol can be utilized in the practice of this invention, it is especially preferred to utilize polymeric hydroxy-functional compounds such as polyethers, polyesters, acrylics, polyurethanes, polycaprolactones, etc.

Preferably the hydroxy-functional polymer will have a number average molecular weight of at least about 400. Typical number average molecular weights will range from about 400 to about 30,000, and especially 500 to about 7,000. In order to provide the fastest rate of reaction during cure it is preferred in the practice of this invention to utilize hydroxy-functional compounds having predominantly, and preferably all, primary hydroxyl functionality.

Representative hydroxy-functional polymers include those described in Sections 1.1 through 1.5 below:

1.1. Polyether polyols are well known in the art and are conveniently prepared by the reaction of a diol or polyol with the corresponding alkylene oxide. These materials are commercially available and may be prepared by a known process such as, for example, the processes described in *Encyclopedia of Chemical Technology*, Volume 7, pages 257-262, published by Interscience Publishers, Inc., 1951. Representative examples include the polypropylene ether glycols and polyethylene ether glycols such as those marketed as Niax ® Polyols from Union Carbide Corporation.

1.2. Another useful class of hydroxy-functional polymers are those prepared by condensation polymerization reaction techniques as are well known in the art. Representative condensation polymerization reactions include polyesters prepared by the condensation of polyhydric alcohols and polycarboxylic acids or anhydrides, with or without the inclusion of drying oil, semi-drying oil, or non-drying oil fatty acids. By adjusting the stoichiometry of the alcohols and the acids while maintaining an excess of hydroxyl groups, hydroxy-functional polyesters can be readily produced to provide a wide range of desired molecular weights and performance characteristics.

The polyester polyols are derived from one or more aromatic and/or aliphatic polycarboxylic acids, the anhydrides thereof, and one or more aliphatic and/or aromatic polyols. The carboxylic acids include the saturated and unsaturated polycarboxylic acids and the derivatives thereof, such as maleic acid, fumaric acid, succinic acid, adipic acid, azelaic acid, and dicyclopentadiene dicarboxylic acid. The carboxylic acids also include the aromatic polycarboxylic acids, such as phthalic acid, isophthalic acid, terephthalic acid, etc. Anhydrides such as maleic anhydride, phthalic anhydride, trimellitic anhydride, or Nadic Methyl Anhydride (brand name for methylbicyclo[2.2.1]heptene-2,3-dicarboxylic anhydride isomers) can also be used.

Representative saturated and unsaturated polyols which can be reacted in stoichiometric excess with the carboxylic acids to produce hydroxy-functional polyesters include diols such as ethylene glycol, dipropylene glycol, 2,2,4-trimethyl 1,3-pentanediol, neopentyl glycol, 1,2-propanediol, 1,4-butanediol, 1,3-butanediol, 2,3-butanediol, 1,5-pentanediol, 1,6-hexanediol, 2,2-dimethyl-1,3-propanediol, 1,4-cyclohexanedimethanol, 1,2-cyclohexanedimethanol, 1,3-cyclohexanedimethanol, 1,4-bis(2-hydroxyethoxy)cyclohexane, trimethylene glycol, tetramethylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, and polyols such as trimethylolethane, trimethylolpropane, trimethylolhexane, triethylolpropane, 1,2,4-butanetriol, glycerol, pentaerythritol, dipentaerythritol, etc.

Typically, the reaction between the polyols and the polycarboxylic acids is conducted at about 120° C. to about 200° C. in the presence of an esterification catalyst such as dibutyl tin oxide.

1.3. Additionally, hydroxy-functional polymers can be prepared by the ring opening reaction of epoxides and/or polyepoxides with primary or, preferably, secondary amines or polyamines to produce hydroxy-functional polymers. Representative amines and polyamines include ethanol amine, N-methylethanol amine, dimethyl amine, ethylene diamine, isophorone diamine, etc. Representative polyepoxides include those prepared by condensing a polyhydric alcohol or polyhydric phenol with an epihalohydrin, such as epichlorohydrin, usually under alkaline conditions. Some of these condensation products are available commercially under the designations EPON or DRH from Shell Chemical Company, and methods of preparation are representatively taught in U.S. Pat. Nos. 2,592,560; 2,582,985 and 2,694,694.

1.4. Other useful hydroxy-functional polymers can be prepared by the reaction of at least one polyol, such as those representatively described in Section 1.2 above, with polyisocyanates to produce hydroxy-functional urethanes. Representative polyisocyanates having two or more isocyanate groups per molecule include the aliphatic compounds such as ethylene, trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 3-isocyanatomethyl-3,5,5-trimethylcyclohexylisocyanate, and the 1,3-cyclopentane, 1,3-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-toluene, or mixtures thereof, 4,4'-toluidine, and 1,4-xylylene diisocyanates; the nuclear substituted aromatic compounds such as dianisidine diisocyanate, 4,4'-diphenylether diisocyanate and chlorodiphenylene diisocyanate; the triisocyanates such as triphenyl methane-4,4',4"-triisocyanate, 1,3,5-triisocyanate benzene and 2,4,6-triisocyanate toluene; and the tetraisocyanates such as 4,4'-diphenyl-dimethyl methane-2,2'-5,5'-tetraisocyanate; the polymerized polyisocyanates such as tolylene diisocyanate dimers and trimers, and other various polyisocyanates containing biuret, urethane, and/or allophanate linkages. The polyisocyanates and the polyols are typically reacted at temperatures of 25° C. to about 150° C. to form the hydroxy-functional polymers.

1.5. Useful hydroxy-functional polymers can also be conveniently prepared by free radical polymerization techniques such as in the production of acrylic resins. The polymers are typically prepared by the addition polymerization of one or more monomers. At least one of the monomers will contain, or can be reacted to produce, a reactive hydroxyl group. Representative hydroxy-functional monomers include 2-hydroxyethyl acrylate, 2-hydroxypropyl acrylate, 4-hydroxybutyl methacrylate, 2-hydroxypropyl methacrylate, 3-hydroxybutyl acrylate, 4-hydroxypentyl acrylate, 2-hydroxyethyl ethacrylate, 3-hydroxybutyl methacrylate, 2-hydroxyethyl chloroacrylate, diethylene glycol methacrylate, tetraethylene glycol acrylate, para-vinyl benzyl alcohol, etc. Typically the hydroxy-functional monomers would be copolymerized with one or more monomers having ethylenic unsaturation such as:

(i) esters of acrylic, methacrylic, crotonic, tiglic, or other unsaturated acids such as: methyl acrylate, ethyl acrylate, propyl acrylate, isopropyl acrylate, butyl acrylate, isobutyl acrylate, ethylhexyl acrylate, amyl acrylate, 3,5,5-trimethylhexyl acrylate, methyl methacrylate, ethyl methacrylate, propyl methacrylate, isobornyl methacrylate, dimethylaminoethyl methacrylate, ethyl tiglate, methyl crotonate, ethyl crotonate, etc.;

(ii) vinyl compounds such as vinyl acetate, vinyl propionate, vinyl butyrate, vinyl isobutyrate, vinyl benzoate, vinyl m-chlorobenzoate, vinyl p-methoxybenzoate, vinyl alpha-chloroacetate, vinyl toluene, vinyl chloride, etc.;

(iii) styrene-based materials such as styrene, alpha-methyl styrene, alpha-ethyl styrene, alpha-bromo styrene, 2,6-dichlorostyrene, etc.;

(iv) allyl compounds such as allyl chloride, allyl acetate, allyl benzoate, allyl methacrylate, etc.;

(v) other copolymerizable unsaturated monomers such as acrylonitrile, methacrylonitrile, dimethyl maleate, isopropenyl acetate, isopropenyl isobutyrate, acrylamide, methacrylamide, and dienes such as 1,3-butadiene, etc.

The polymers are conveniently prepared by conventional free radical addition polymerization techniques. Frequently, the polymerization will be initialized by conventional initiators known in the art to generate a free radical such as azobis(isobutyronitrile), cumene hydroperoxide, t-butyl perbenzoate, etc. Typically, the acrylic monomers are heated in the presence of the initiator at temperatures ranging from about 35° C. to about 200° C., and especially 75° C. to 150° C., to effect the polymerization. The molecular weight of the polymer can be controlled, if desired, by the monomer selection, reaction temperature and time, and/or the use of chain transfer agents as is well known in the art.

Especially preferred in the practice of this invention are hydroxy-functional polyesters and hydroxy-functional acrylic polymers. An especially preferred hydroxy-functional polymer is the addition polymerization reaction product of (a) 10 to about 40 weight percent of a hydroxy-functional ethylenically unsaturated monomer and (b) 60 to about 90 weight percent of at least one ethylenically unsaturated monomer copolymerizable with the hydroxy-functional monomer.

2. ANHYDRIDE-FUNCTIONAL COMPOUNDS

The anhydride-functional compounds which are useful in the practice of this invention can be any aliphatic or aromatic compound having at least two cyclic carboxylic acid anhydride groups in the molecule. Polymeric anhydrides having number average molecular weights between 500 and 7,000 are most useful. Especially preferred in the practice of this invention is the use of free radical addition polymers, such as acrylic polymers, having anhydride functionality. These are conveniently prepared as is well known in the art by polymerizing an unsaturated monomer having anhydride functionality, such as maleic anhydride, citraconic anhydride, itaconic anhydride, propenyl succinic anhydride, etc. with other ethylenically unsaturated monomers such as the esters of unsaturated acids, vinyl compounds, styrene-based materials, allyl compounds and other copolymerizable monomers, all as representatively taught in Section 1.5. of this specification and also may include, as polymerizable monomers, unsaturated acids.

For some applications, it is preferred to utilize an anhydride-functional polymer which has no free carboxylic acid groups on the anhydride-functional polymer. Surprisingly, however, the incorporation of relatively small amounts, e.g. less than about 15% of the total polymer weight, of an unsaturated monomer having free carboxylic acid groups, e.g. acrylic acid, methacrylic acid, tiglic acid, crotonic acid, maleic acid, etc., can provide improved color and extended stability and pot-life in certain formulations, especially those incorporating amines as catalysts. Therefore, one preferred approach to the formulation of the anhydride-functional compounds involves those prepared by the addition polymerization of at least one unsaturated monomer having anhydride functionality, at least one unsaturated monomer having free carboxylic acid functionality, and, optionally, at least one other ethylenically unsaturated copolymerizable monomer.

The monomers which are copolymerized with the unsaturated anhydride should, of course, be free of any functionality which could react with the anhydride group during the polymerization. The anhydride-functional addition polymers can be conveniently prepared by conventional free radical addition polymerization techniques. Typically the polymerization will be conducted in an inert solvent and in the presence of an initiator at temperatures ranging from 35° C. to about 200° C. An especially preferred anhydride-functional vehicle comprises the free radical addition polymerization product of (a) 5 to 40, and especially 15 to about 25, weight percent of an ethylenically unsaturated monoanhydride and (b) 60 to 95, and especially 75 to about 85, weight percent of at least one other ethylenically unsaturated monomer copolymerizable with the ethylenically unsaturated anhydride.

Another especially preferred anhydride-functional polymeric vehicle comprises the free radical addition product of:

(a) 5 to about 40, and especially 15 to about 25, weight percent of an ethylenically unsaturated monoanhydride monomer; and (b) 1 to about 15 weight percent of an ethylenically unsaturated carboxylic acid monomer copolymerizable with the ethylenically unsaturated monoanhydride; and (c) 45 to about 94 weight percent of at least one ethylenically unsaturated monomer which is copolymerizable with the ethylenically unsaturated monoanhydride and ethylenically unsaturated acid.

Surprisingly, it has been found that anhydride-functional polymers incorporating acrylate monomers, such as acrylic acid, butyl acrylate, etc. frequently provide a darker color polymer when used in combination with the preferred amine catalysts, e.g. imidazoles, of this invention than similar polymers using the corresponding methacrylate monomers such as methacrylic acid, butyl methacrylate, etc. Therefore, in those cases where color development may be critical it is preferred to minimize the amount of acrylate monomer, e.g. from 0 to not more than about 10 weight percent of the total monomer mixture. Especially preferred to minimize color development are anhydride-functional free radical addition polymers which are the polymerization product of monomers which are free of acrylate groups. These monomers may, of course, contain methacrylate functionality or other $\alpha$-$\beta$-unsaturated carbonyl functionality where the $\alpha$ carbon is not directly bonded to a hydrogen atom.

Other polyanhydrides, in addition to the anhydride-functional addition polymerization products, can also be utilized in the practice of this invention. Ester anhydrides can be prepared, as is known in the art, by the reaction of e.g. trimellitic anhydride with polyols. Other representative, suitable polyanhydrides include poly-functional cyclic dianhydrides such as cyclopentane tetracarboxylic acid dianhydride, diphenyl-ether tetracarboxylic acid dianhydride, 1,2,3,4,-butane tetracarboxylic acid dianhydride, and the benzophenone tetracarboxylic dianhydrides such as 3,3',4,4'-benzophenone tetracarboxylic dianhydride, and 2,bromo-3,3',4,4'-benzophenone tetracarboxylic acid dianhydride. Trianhydrides such as the benzene and cyclohexene hexacarboxylic acid trianhydrides are also useful.

Additionally, useful polyanhydrides can be prepared by the maleinization of polyunsaturated compounds such as unsaturated rubbers, unsaturated oils and unsaturated hydrocarbons.

3. EPOXY-FUNCTIONAL COMPOUNDS

The coatings of this invention also require the use of at least one epoxy-functional compound. The epoxy compounds can be monoepoxies, or, preferably, a polyepoxide having an average of at least two epoxy groups per molecule.

Representative useful monoepoxies include the monoglycidyl ethers of aliphatic or aromatic alcohols such as butyl glycidyl ether, octyl glycidyl ether, nonyl glycidyl ether, decyl glycidyl ether, dodecyl glycidyl ether, p-tert-butylphenyl glycidyl ether, and o-cresyl glycidyl ether. Monoepoxy esters such as the glycidyl ester of versatic acid (commercially available as CARDURA® E from Shell Chemical Company), or the glycidyl esters of other acids such as tertiary-nonanoic acid, tertiary-decanoic acid, tertiary-undecanoic acid, etc. are also useful. Similarly, if desired, unsaturated monoepoxy esters such as glycidyl acrylate, glycidyl methacrylate or glycidyl laurate could be used. Additionally, monoepoxidized oils can also be used.

Other useful monoepoxies include styrene oxide, cyclohexene oxide, 1,2-butene oxide, 2,3-butene oxide, 1,2-pentene oxide, 1,2-heptene oxide, 1,2-octene oxide, 1,2-nonene oxide, 1,2-decene oxide, and the like.

It is only necessary that the monoepoxide compounds have a sufficiently low volatility to remain in the coating composition under the applicable conditions of cure.

Polyepoxides are especially preferred in the reactive coatings of this invention. Especially preferred as the poly-functional epoxy compounds, due to their reactivity and durability, are the polyepoxy-functional cycloaliphatic epoxies. Preferably, the cycloaliphatic epoxies will have a number average molecular weight less than about 2,000 to minimize the viscosity. The cycloaliphatic epoxies are conveniently prepared by methods well known in the art such as epoxidation of dienes or polyenes, or the epoxidation of unsaturated esters by reaction with a peracid such as peracetic and/or performic acid.

Commercial examples of representative preferred cycloaliphatic epoxies include 3,4-epoxycyclohexylmethyl 3,4-epoxycyclohexane carboxylate (e.g. "ERL-4221" from Union Carbide Corp.); bis(3,4-epoxycyclohexylmethyl)adipate (e.g. "ERL-4299" from Union Carbide Corporation); 3,4-epoxy-6-methylcyclohexylmethyl 3,4-epoxy-6-methylcyclohexane carboxylate (e.g. "ERL-4201" from Union Carbide Corp.); bis(3,4-epoxy-6-methylcyclohexylmethyl)adipate (e.g. "ERL-4289" from Union Carbide Corp.); bis(2,3-epoxycyclopentyl) ether (e.g. "ERL-0400" from Union Carbide Corp.); dipentene dioxide (e.g. "ERL-4269" from Union Carbide Corp.); 2-(3,4-epoxycyclohexyl-5,5-spiro-3,4-epoxy)cyclohexane-metadioxane (e.g. "ERL-4234" from Union Carbide Corp.). Other commercially available cycloaliphatic epoxies are available from Ciba-Geigy Corporation such as CY 192, a cycloaliphatic diglycidyl ester epoxy resin having an epoxy equivalent weight of about 154. The manufacture of representative cycloaliphatic epoxies is taught in various patents including U.S. Pat. Nos. 2,884,408, 3,027,357 and 3,247,144.

Other polyepoxides potentially useful in the practices of this invention include aliphatic and aromatic polyepoxies, such as those prepared by the reaction of an aliphatic polyol or polyhydric phenol and an epihalohydrin. Other useful epoxies include epoxidized oils and acrylic polymers derived from ethylenically unsaturated epoxy-functional monomers such as glycidyl acrylate or glycidyl methacrylate in combination with other copolymerizable monomers such as those listed in 1.5 above.

Since hydroxyl functionality is already available in the reactive coatings from the hydroxy-functional compounds of this invention, it is often desirable to utilize epoxy-functional compounds which are substantially free of hydroxyl groups. The ratios of anhydride to hydroxyl to epoxy groups can be widely varied within the practice of this invention as long as at least some amount of each of the anhydride-functional compound, the hydroxy-functional compound and the epoxy-functional compound are present in the coating mixture. It is especially preferred, however, to provide 0.3 to about 6.0 hydroxyl groups and about 0.3 to about 6.0 epoxy groups for each anhydride group in the reactive system. It is especially preferred to provide 0.5 to 1.5 hydroxyl groups and 0.5 to 1.5 epoxy groups for each anhydride group. At least one of the hydroxy-functional compound, the epoxy-functional compound, or the anhydride-functional compound should be a film forming polymer, and each of the compounds should be mutually soluble with the other compounds.

The coatings of this invention can be cured at temperatures ranging from about room temperature up to about 350° F. The coatings can be used as clear coatings or they may contain pigments as is well known in the art. Representative opacifying pigments include white pigments such as titanium dioxide, zinc oxide, antimony oxide, etc. and organic or inorganic chromatic pigments such as iron oxide, carbon black, phthalocyanine blue, etc. The coatings may also contain extender pigments such as calcium carbonate, clay, silica, talc, etc.

The coatings may also contain other additives such as flow agents, catalysts, diluents, solvents, ultraviolet light absorbers, etc.

It is especially preferred in the practice of this invention to include a catalyst for the reaction of anhydride groups and hydroxyl groups and also a catalyst for the reaction of epoxy and acid groups. It is especially preferred in the practice of this invention to utilize tertiary amines and especially N-methylimidazole as a catalyst for the anhydride/hydroxyl reaction. The catalyst for the anhydride/hydroxyl reaction will typically be present at a level of at least 0.01% by weight of the anhydride compound and preferably 1.0 to about 5.0%.

Tertiary amines, secondary amines such as ethyl imidazole, quaternary ammonium salts, nucleophilic catalysts, such as lithium iodide, phosphonium salts, and phosphines such as triphenyl phosphine are especially useful as catalysts for epoxy/acid reactions. Electrophillic catalysts, such as tin metal salts or complexes, are also useful in the practice of this invention. The catalyst for the epoxy/acid reaction will typically be present at a level of at least 0.01% by weight of the total acid-functional compound and epoxy-functional compound and, preferably, will be present at 0.1 to about 3.0%.

The coatings of this invention may typically be applied to any substrate such metal, plastic, wood, glass, synthetic fibers, etc. by brushing, dipping, roll coating, flow coating, spraying or other method conventionally employed in the coating industry. If desired, the substrates may be primed prior to application of the coatings of this invention.

One preferred application of the curable coatings of this invention relates to their use as clearcoats in clearcoat/basecoat formulations.

Clearcoat/basecoat systems are well known, especially in the automobile industry where it is especially useful to apply a pigmented basecoat, which may contain metallic pigments, to a substrate and allow it to form a polymer film followed by the application of a clearcoat which will not mix with or have any appreciable solvent attack upon the previously applied basecoat. The basecoat composition may be any of the polymers known to be useful in coating compositions including the reactive compositions of this invention.

One useful polymer basecoat includes the acrylic addition polymers, particularly polymers or copolymers of one or more alkyl esters of acrylic acid or methacrylic acid, optionally together with one or more other ethylenically unsaturated monomers. These polymers may be of either the thermoplastic type or the thermosetting, crosslinking type which contain hydroxyl or amine or other reactive functionality which can be crosslinked. Suitable acrylic esters and unsaturated monomers for either type of polymer include methyl methacrylate, ethyl methacrylate, propyl methacrylate, butyl methacrylate, ethyl acrylate, butyl acrylate, vinyl acetate, acrylonitrile, acrylamide, styrene, vinyl chloride, etc. Where the polymers are required to be of the crosslinking type, suitable functional monomers which can be used in addition to those already mentioned include acrylic or methacrylic acid, hydroxy ethyl acrylate, 2-hydroxy propyl methacrylate, glycidyl acrylate, tertiary-butyl amino ethyl methacrylate, etc. The basecoat composition may, in such a case, also contain a crosslinking agent such as a polyisocyanate, a polyepoxide, or a nitrogen resin such as a condensate of an aldehyde such as formaldehyde with a nitrogeneous compound such as urea, melamine or benzoguanamine or a lower alkyl ether of such a condensate. Other polymers useful in the basecoat composition include vinyl copolymers such as copolymers of vinyl esters of inorganic or organic acids, such as vinyl chloride, vinyl acetate, vinyl propionate, etc., which copolymers may optionally be partially hydrolyzed so as to introduce vinyl alcohol units.

Other polymers useful in the manufacture of the basecoat include alkyd resins or polyesters which can be prepared in a known manner by the condensation of polyhydric alcohols and polycarboxylic acids, with or without the inclusion of natural drying oil fatty acids as described elsewhere in this specification. The polyesters or alkyds may contain a proportion of free hydroxyl and/or carboxyl groups which are available for reaction, if desired with suitable crosslinking agents as discussed above.

If desired, the basecoat composition may also contain minor amounts of a cellulose ester, to alter the drying or viscosity characteristics of the basecoat.

Typically, the basecoat will include pigments conventionally used for coating compositions and after being applied to a substrate, which may or may not previously have been primed, the basecoat will be allowed sufficient time to form a polymer film which will not be lifted during the application of the clearcoat. The basecoat may be heated or merely allowed to air-dry to form the film. Generally, the basecoat will be allowed to dry for about 1 to 20 minutes before application of the clearcoat. The clearcoat is then applied to the surface of the basecoat, and the system can be allowed to dry at room temperature or, if desired, can be force dried by baking the coated substrate at temperatures typically ranging up to about 350° F.

Typically, the clearcoat may contain ultraviolet light absorbers such as hindered phenols or hindered amines at a level ranging up to about 6% by weight of the vehicle solids as is well known in the art. The clearcoat can be applied by any application method known in the art, but preferably will be spray applied. If desired, multiple layers of basecoat and/or clearcoat can be applied. Typically, both the basecoat and the clearcoat will each be applied to give a dry film thickness of about 0.01 to about 6, and especially about 0.5 to about 3.0 mils.

If desired, the novel reactive compositions taught herein could be used as a basecoat, in which case the clearcoat could also comprise the novel reactive coatings taught herein, or the polymers taught herein as being useful as basecoat formulations could be utilized as clearcoats.

The following examples have been selected to illustrate specific embodiments and practices of advantage to a more complete understanding of the invention. Unless otherwise stated, "parts" means parts-by-weight and "percent" is percent-by-weight. The numeric ratings for solvent resistance (MEK rubs), wet adhesion, and salt spray are on a scale of 0–10, 10 best.

In each of the clearcoat/basecoat formulations described in Examples 14 through 24 the primer was G.B.P. ® etching primer filler (2-component vinyl-butyral based primer commercially available from The Sherwin-Williams Company) and the basecoat was Acrylyd ® acrylic enamel (a lacquer-like coating commercially available from The Sherwin-Williams Company). In each of the clearcoat/basecoat formulations described in Examples 31–35 the primer was a thermoplastic lacquer primer/sealer (commercially available from The Sherwin-Williams Company as Acrylic Gray Sealer P1A38) and the basecoat was Acrylyd ® acrylic enamel F5S112 (a lacquer-like aluminum pigmented basecoat commercially from The Sherwin-Williams Company). The primer, the basecoat and the clearcoat were applied to provide dry film thicknesses of 1.0, 1.0 and 2.0 mils respectively.

The following examples have been selected to illustrate specific embodiments and practices of advantage to a more complete understanding of the invention. Unless otherwise stated "parts" means parts by weight and percent is percent by weight.

EXAMPLE 1

A four neck, round bottom reaction flask equipped with nitrogen inlet, condenser, mechanical stirrer, and fluid metering pump was charged with 4,000 parts methyl amyl ketone and heated to reflux. A monomer mix of 600 parts hydroxy ethyl acrylate, 1,500 parts butyl acrylate, 2,100 parts styrene, 600 parts methyl methacrylate, 1,200 parts Tone TM M-100 (hydroxy-functional acrylic monomer produced by Union Carbide Corporation having a molecular weight of about 344 and believed to be the reaction product of one mole of 2-hydroxyethyl acrylate with 2 moles of ε-caprolactone), 210 parts Vazo-67 (initiator sold by E.I. duPont believed to be 2,2′-azobis(2-methylbutyronitrile)), 55.6 parts 3-mercapto propanol, and a subsequent addition of 64.4 parts 3-mercapto propanol were charged over a period of three hours under a nitrogen blanket while maintaining reflux temperature.

The mixture was maintained at reflux temperature until the resultant resin had a percent solids of approximately 56.4% (94% conversion). The resin was then solvent stripped under vacuum to 80% solids by weight.

and epoxy-functional vehicles according to the following formulations:

| EXAMPLE | HYDROXYL COMPOUND | ANHYDRIDE COMPOUND | EPOXY COMPOUND | RATIO OF ANHYDRIDE/ HYDROXYL/EPOXY GROUPS |
|---|---|---|---|---|
| 5 | EX. 1 | EX. 3 | NONE | 1/1/0 |
| 6 | " | " | ERL 4299[1] | 2/1/1.25 |
| 7 | " | " | " | 2/1/1.5 |
| 8 | " | " | " | 2/1/2 |
| 9 | EX. 2 | " | " | 2/1/1.5 |
| 10 | " | EX. 4 | " | 1/1/1 |

[1]bis(3,4-epoxycyclohexylmethyl)adipate from Union Carbide Corporation.

EXAMPLE 2

In like manner to Example 1, a hydroxy-functional acrylic polymer was prepared by charging a reaction vessel with 279.54 parts aromatic naptha which was heated to about 320° F. A monomer mixture comprising 137.64 parts styrene, 130.54 parts methyl methylacrylate, 196.91 parts butyl acrylate and 186.15 parts hydroxyethyl methacrylate, was charged into the reaction vessel at a uniform rate over about five hours. Simultaneously with the addition of the monomer mixture, a mixture of 28.62 parts t-butyl perbenzoate in 40.60 parts aromatic naptha was also added to the reaction vessel. The reaction mixture was then maintained at about 320° F. for about 90 minutes at which point the resultant resin had a percent solids of approximately 68%.

EXAMPLE 3

An anhydride-functional acrylic polymer was prepared by charging 694.4 parts of maleic anhydride and 2777.8 parts of xylene into a four neck reaction flask equipped with a nitrogen inlet, mechanical stirrer, water trap, condenser and fluid metering pump. The mixture was then heated to reflux, and a monomer mixture comprising 2777.8 parts butyl acrylate, 2777.8 parts methyl methacrylate, 694.4 parts maleic anhydride, and 158 parts t-butyl perbenzoate was charged into the reaction flask over a period of three hours under a nitrogen blanket while maintaining reflux temperature. The mixture was maintained at that temperature for about 15 minutes at which point a mixture of 30.9 parts t-butyl perbenzoate in 277.8 parts xylene was charged over a period of 45 minutes. The reaction mixture was then maintained at reflux temperatures for about two hours. The resulting anhydride-functional resin was about 71% solids by weight, and had an acid value of 113.2.

EXAMPLE 4

In like manner to Example 3 an anhydride-functional resin comprising 20% maleic anhydride, 20% isobutyl methacrylate, 30% butyl acrylate, and 30% methyl methacrylate was prepared as a 91% solid solution in xylene.

EXAMPLES 5-10

Clear coatings were prepared by admixing anhydride-functional vehicles, hydroxyl-functional vehicles Each of the coatings were catalyzed at approximately 3.5% N-methylimidazole (based on anhydride compound solids) and each formulation was reduced with xylene to an appropriate application viscosity and then spray applied over Bonderite ® 1000 treated steel panels. The coatings gave the following test results:

| | EXAMPLE | | | | | |
|---|---|---|---|---|---|---|
| | 5 | 6 | 7 | 8 | 9 | 10 |
| Tack Free Time (hrs.) | 6 | 7 | 8 | 18 | — | — |
| Cure (MEK rubs)[1] | | | | | | |
| air dry (1 day) | 0 | 3 | 2 | 3 | 1 | 1 |
| air dry (11 days) | 0 | 8 | 8 | 9 | 5 | 5 |
| air dry (28 days) | 9 | 9 | 9 | 9 | 5 | 7 |
| Humidity Resistance[1,2] (170 hours) | 10 | 10 | 10 | 10 | 10 | 10 |
| Salt Spray[1,2] | 8 | 8 | 10 | 10 | 10 | 9 |
| Knoop Hardness Number[2] | 40 | 88 | 89 | 87 | 103 | 96 |
| Cure (MEK rubs)[1,3] | 5 | 9 | 9 | 9 | — | — |
| Knoop Hardness Number[3] | 42 | 86 | 88 | 78 | — | — |
| Cure (MEK rubs)[1,4] | 3 | 9 | 9 | 10 | — | — |
| Knoop Hardness Number[4] | 39 | 94 | 96 | 80 | — | — |

[1]scale of 1–10 with 10 being highest
[2]after air dry for 28 days
[3]after 180° F. bake for 30 minutes
[4]after 250° F. bake for 30 minutes As shown in these results, the addition of the epoxy compound improves cure and hardness performance as opposed to similar formulations without epoxy. All of the Example formulations showed excellent clarity.

EXAMPLE 11

A hydroxyl-functional polymer was prepared by charging a polymerization reactor equipped with a mechanical stirrer, a water cooled condenser, nitrogen inlet, water trap, thermometer, heating mantle and fluid metering pump with 172.5 parts of n-butyl acetate. The reaction vessel was heated to approximately 237° F. and a monomer premix composed of 96.2 parts of methyl methacrylate, 63.0 parts of butyl acrylate, 58 parts of hydroxy ethyl methacrylate, 54 parts styrene and an initiator premixture composed of 11.5 parts of n-butyl acetate and 5.7 parts of Vazo 67 was metered simultaneously into the polymerization reactor at a constant rate over approximately 4 hours. The reaction temperature was maintained for an additional 2 hours after the addition was completed and cooled for one hour. The resulting hydroxy-functional polymer had a number average molecular weight of approximately 9,600.

EXAMPLE 12

A 4 neck, round bottomed flask equipped with mechanical stirrer, reflux condenser, thermometer, nitrogen inlet and fluid metering pump was charged with 1472 parts xylene, 240 parts maleic anhydride and heated to reflux (139° C.) under nitrogen. A monomer mixture of 480 parts isobutyl methacrylate, 720 parts butyl acrylate, 720 parts methyl methacrylate, 120 parts maleic anhydride and 60 parts t-butyl perbenzoate were then metered into the reaction over a 3-hour period. Halfway through the addition, an additional 120 parts of maleic anhydride was charged to the reaction vessel and monomer addition was continued. After refluxing the reaction mixture for an additional 15 minutes, 12 parts of t-butyl perbenzoate in 128 parts xylene were added over 45 minutes. Heating was continued for 2 hours at reflux. The resulting xylene soluble anhydride-functional resin was 61.2% solids, had a Gardner Holdt viscosity of 24.5, an acid value of 116.5, and a density of approximately 8.6 pounds per gallon.

EXAMPLE 13

A reaction vessel equipped as in Example I was charged with 6,624 parts of xylene, 648 parts of maleic anhydride and heated to reflux under nitrogen. To this heated solution a monomer mixture of 5,616 parts butyl acrylate, 3,024 parts methylmethacrylate, 540 parts maleic anhydride and 270 parts of t-butyl peroctoate was metered into the reaction vessel at a constant rate over a 3-hour time period. At 1 hour and at 2 hours into the monomer addition, heating and monomer addition were stopped and the reactor was charged with 540 parts and 432 parts of maleic anhydride respectively. Heating was resumed to reflux and the monomer addition was continued. The reaction mixture was maintained at reflux temperature for an additional 15 minutes after the completion of all of the monomer addition. A solution of 54 parts of t-butyl peroctoate in 576 parts xylene was added to the reaction over a 45-minute period. The reaction was held at reflux for an additional 2 hours and then allowed to cool to room temperature to obtain an anhydride-functional polymer having a number average molecular weight of about 1,800 and a free maleic anhydride content of less than 0.1%. This polymer had an average of about 3.6 anhydride groups per molecule.

EXAMPLE 14

A curable clear coating intended for use over a basecoat/primer system was prepared according to the following recipe:

| Raw Materials | Parts |
| --- | --- |
| Hydroxy-Functional Polymer of Example 11 | 346.17 |
| Anhydride-Functional Polymer of Example 12 | 187.21 |
| ERL 4221 | 47.89 |
| Xylene | 184.71 |
| BYK 300 | 2.5 |
| 20% N-methylimidazole/Methyl Isobutyl Ketone | 19.98 |
| 20% Triphenylphosphine/Toluene | 5.25 |
| 20% Tinuvin 328/Toluene | 23.42 |
| Tinuvin 292 | 2.81 |

This coating formulation represents approximately 1.5 hydroxyl groups and 1.5 epoxy groups per each anhydride group. The N-methylimidazole catalyst was present at approximately 3.5% based on anhydride solids. The triphenylphosphine catalyst was present at approximately 1% based upon epoxy solids. This coating was reduced with suitable solvents and spray applied over a basecoat/primer system on iron phosphate treated cold rolled steel. This coating system was allowed to ambient cure 24 hours before testing.

The resultant film exhibited a Konig Pendulum Hardness of 14 after one day, 32 after one week and 52 after four weeks. The coating exhibited a solvent resistance (MEK rubs) rating of 9 after one day. A wet adhesion rating of 8 was obtained immediately after one week exposure to humidity.

EXAMPLES 15-24

Examples 15-24 were carried out by a similar procedure to that described for Example 14 except for the modifications described in the table below. The anhydride-functional polymer used in Examples 15-24 is that of Example 13. The properties listed in the table below illustrate the effects of various coating formulations.

| Example | 15 | 16 | 17 | 18 | 19 | 20 | 21 | 22 | 23 | 24 |
| --- | --- | --- | --- | --- | --- | --- | --- | --- | --- | --- |
| Component Equivalents | | | | | | | | | | |
| Epoxy | .33 | 1 | 3 | .5 | 1 | 2 | 1 | .56 | 1 | 1.75 |
| Hydroxyl | .33 | 3 | 1 | 1 | .5 | 2 | 1 | .56 | 1.75 | 1 |
| Anhydride | 1 | 1 | 1 | 1 | 1 | 1 | 1 | 1 | 1 | 1 |
| Konig Pendulum hardness (3 weeks) | 69 | 56 | 39 | 68 | 74 | 56 | 69 | 73 | 69 | 66 |
| MEK Rubs (3 weeks) | 6 | 5 | 9 | 7 | 9 | 7 | 7 | 7 | 7− | 9 |
| 20° Gloss | 52 | 81 | 78 | 77 | 78 | 81 | 78 | 74 | 79 | 81 |
| Dry Film Thickness (mils) | 3.5 | 3.8 | 3.1 | 3.5 | 3.2 | 3.4 | 3.5 | 3.5 | 3.5 | 3.5 |
| Humidity | | | | | | | | | | |
| Init 20° Gloss | 53 | 85 | 82 | 79 | 79 | 85 | 79 | 77 | 83 | 84 |
| Final 20° Gloss | 53 | 73 | 48 | 68 | 66 | 78 | 68 | 65 | 75 | 73 |
| % Retention | 100 | 86 | 59 | 86 | 84 | 92 | 86 | 84 | 90 | 87 |
| Wet Adhesion | 9+ | 10 | 8 | 10 | 10 | 10 | 10 | 10 | 10 | 9+ |
| Blushing | 5 | 8 | 5 | 9 | 9 | 7 | 7 | 7 | 7 | 6 |
| Salt Spray Scribe Corrosion | 10 | 9 | 9 | 9 | 8 | 10− | 8 | 10 | 9 | 9 |
| Wet Adhesion | 10 | 10 | 10 | 10 | 10 | 10 | 10 | 10 | 10 | 10 |
| Scribe Blister | NONE | NONE | NONE | NONE | NONE | NONE | NONE | NONE | NONE | NONE |

EXAMPLE 25

A 4-neck, round bottomed flask equipped with mechanical stirrer, reflux condenser, thermometer, nitrogen inlet, water trap and fluid metering pump was charged with 1,280 parts xylene, 170.2 parts maleic anhydride and heated to reflux (139° C.) under nitrogen for a period of 15 minutes to remove water. The reaction mixture was cooled to 120° C. To this solution was added a monomer mixture of 591.6 parts isobutyl methacrylate, 918 parts butyl methacrylate, 122.4 parts methacrylic acid, 102 parts maleic anhydride and 61.2 parts t-butyl peroctoate that was metered into the reaction vessel at a constant rate over 3 hours. Halfway through the monomer addition, 135.8 parts of maleic anhydride was charged. The reaction mixture was maintained at 120° C. for an additional 15 minutes after the completion of all of the monomer addition. A solution of 80 parts xylene and 10.2 parts t-butyl peroctoate was added to the reaction over a 45 minute period. The reaction was held for 1½ hours at 120° C., heated to reflux (136° C.) for ½ hour to remove water and then the product was cut to 50% theoretical NVM by the addition of 680 parts xylene. The reaction mixture was allowed to cool to room temperature to obtain an anhydride-functional polymer having an average molecular weight of about 4,000, a polydispersity of 2.3, and a theoretical anhydride equivalent weight of 490.

EXAMPLE 26

A 4-neck, round bottomed flask equipped with mechanical stirrer, reflux condenser, thermometer, nitrogen inlet, water trap and fluid metering pump was charged with 1,472 parts xylene, 168 parts maleic anhydride and heated to reflux (139° C.) under nitrogen. A monomer mixture of 960 parts methyl methacrylate, 192 parts butyl acrylate, 768 parts isobutyl methacrylate, 120 parts maleic anhydride and 60 parts t-butyl perbenzoate were metered at a constant rate into the reaction vessel over a 3 hour time period. At 1 and 2 hours into the monomer addition the heating and monomer addition were stopped and an additional 120 parts and 72 parts, respectively of maleic anhydride was charged to the reaction vessel. Heating was resumed to reflux and the monomer addition was continued. The reaction mixture was maintained at reflux for an additional 15 minutes after the completion of all of the monomer addition. A solution of 12 parts t-butyl perbenzoate in 128 parts xylene was added to the reaction over a 45 minute time period. The reaction was held at reflux for an additional 2 hours and then allowed to cool to room temperature to obtain an anhydride-functional polymer having a number average molecular weight of 2,400 and a polydispersity of 2.1.

EXAMPLE 27

A 4-neck, round bottomed flask equipped with mechanical stirrer, reflux condenser, thermometer, nitrogen inlet, water trap and fluid metering pump was charged with 1,634 parts xylene, 264 parts maleic anhydride and heated to reflux (139° C.) under nitrogen. To this heated solution, a monomer mixture of 1,372.8 parts butyl methacrylate, 739.2 parts lauryl methacrylate, 132 parts maleic anhydride and 59.4 parts t-butyl peroctoate was metered into the reaction vessel at a constant rate over a 2½ hour time period. Halfway through the monomer addition, heating and monomer addition were stopped and the reactor was charged with 132 parts of maleic anhydride. Heating was resumed to reflux and the monomer addition was continued. The reaction mixture was maintained at reflux temperature for an additional 15 minutes after the completion of the monomer addition. A solution of 13.2 parts t-butyl peroctoate and 126 parts xylene was added to the reaction over a 45 minute time period. The reaction was held at reflux for an additional 2 hours and then allowed to cool to room temperature to obtain an anhydride-functional polymer having a number average molecular weight of 3,200, a polydispersity of 2.1, and a theoretical anhydride equivalent weight of 490.

EXAMPLE 28

A 4-neck, round bottomed flask equipped with mechanical stirrer, reflux condenser, thermometer, nitrogen inlet, water trap and fluid metering pump was charged with 1,660 parts xylene, 264 parts maleic anhydride and heated to reflux (139° C.) under nitrogen. A monomer mixture of 1,372.8 parts butyl acrylate, 507.4 parts methyl methacrylate, 231.8 parts methacrylic acid, 132 parts maleic anhydride and 59.4 parts t-butyl peroctoate were metered at a constant rate into the reaction over a 2½ hour period. Halfway through the monomer addition, heating and monomer addition were stopped and an additional 132 parts of maleic anhydride was charged to the reaction vessel. Heating was resumed to reflux, and the monomer addition was continued. The reaction mixture was maintained at reflux temperature for an additional 15 minutes after the completion of all the monomer addition. A solution of 13.2 parts t-butyl peroctoate in 100 parts xylene was added to the reaction mixture over a 45 minute period. The reaction was held at reflux for an additional 2 hours and then allowed to cool to room temperature to obtain an anhydride-functional polymer having a number average molecular weight of 1,900, a polydispersity of 2.1, and a theoretical anhydride equivalent weight of 490.

EXAMPLE 29

A hydroxy-functional polymer was prepared by initially charging a polymerization reactor equipped with a mechanical stirrer, water cooled condenser, nitrogen inlet, thermometer, heating mantle, and fluid metering pump, 1,686.9 parts xylene and heated to slightly below reflux (135° C.). A monomer mixture of 967 parts styrene, 322.3 parts methyl methacrylate, 709.1 parts Tone™ M100, 386.8 parts butyl acrylate, 193.4 parts hydroxy ethyl acrylate and 252.7 parts t-butyl peroctoate was metered into the reaction vessel at a constant rate over a 3 hour time period. The reaction temperature was lowered from 135° C. to 121° C. during the reaction to maintain the temperature at slightly less than reflux. Temperature was held at 121° C. for an addition 15 minutes after the completion of the addition of all monomers. A solution of 2.6 parts t-butyl peroctoate in 10.7 parts xylene was added over a 15 minute time period, and the reaction was held at 121° C. for an additional 15 minute time period. Another solution of 2.6 parts t-butyl peroctoate in 10.7 parts xylene was then added over a 15 minute time period, and the reaction was again held at 121° C. for an additional 15 minute time period. A final solution of 2.6 parts t-butyl peroctoate in 10.7 parts xylene was then added over a 15 minute time period, and the reaction was held at 121° C. for 1½ hours. A water trap was installed and the reaction was heated to reflux (130° C.) for a 30 minute time period to remove water. The reaction mixture was allowed to cool to room temperature and yielded a hydroxy-functional polymer having a number average molecular weight of 3,000, a polydispersity of 3.0, and a theoretical hydroxyl equivalent weight of 691.6.

EXAMPLE 30

A hydroxy-functional polymer was prepared by initially charging a polymerization reactor equipped with a mechanical stirrer, water cooled condenser, nitrogen inlet, water trap, thermometer, heating mantle, fluid metering pump, 1,264 parts xylene and heated to 138° C. under nitrogen. A monomer mixture of 1,821.6 parts styrene, 1,214.4 parts Tone TM M100 and 151.8 parts Vazo 67 was metered into the reaction vessel at a constant rate over a 3 hour time period. The reaction temperature was maintained at 138° C. for an additional 15 minutes after the complete monomer addition. A solution of 15.9 parts Vazo 67 in 100 parts xylene was then added to the reaction over a 1 hour time period. The reaction was held for an additional 2 hours and then allowed to cool to room temperature. The resulting hydroxy-functional polymer had a number average molecular weight of 4,000, a polydispersity of 1.9, and a theoretical hydroxy equivalent weight of 860.

EXAMPLE 31

A clear coating formulation was prepared as follows:

| Ingredients | Parts By Weight |
| --- | --- |
| Hydroxy-Functional Polymer (Example 29) | 206.54 |
| Anhydride-Functional Polymer (Example 25) | 377.98 |
| ERL 4299 | 71.43 |
| Xylene | 111.09 |
| Byk 300 | 2.50 |
| 20% N-Methylimidazole/Methyl Isobutyl Ketone | 15.32 |
| 20% Tinuvin 328/Toluene | 23.13 |
| Tinuvin 292 | 2.77 |

This coating represents approximately 1 hydroxyl group per 2 epoxy groups per 2 anhydride groups. The N-Methylimidazole catalyst was present at approximately 1.75% based on anhydride resin solids. The presence of all methacrylate monomers and methacrylic acid in the anhydride resin gives less color in the clear formulation than similar formulations with higher acrylate content and/or less acid in the anhydride-functional polymer. This coating was reduced with suitable solvents and spray applied over a basecoat/primer system coated on Bonderite-1000 panels (iron phosphate treatment on cold rolled steel). This coating system was allowed to cure 24 hours under ambient conditions prior to testing.

The cured coating formulation showed only a very light yellow color in the clearcoat, and exhibited 1 day, 2 and 4 week Konig Pendulum harness readings of 10, 30 and 41, respectively. Distinctness of image (DOI) and 20 degree gloss values were 87 and 89. The wet adhesion rating (humidity) was 10. Percent gloss retention (humidity) was 92%.

EXAMPLE 32

A clear coating formulation was prepared as follows:

| Ingredients | Parts By Weight |
| --- | --- |
| Hydroxy-Functional Polymer (Example 30) | 211.83 |
| Anhydride-Functional Polymer (Example 26) | 261.55 |
| ERL 4299 | 64.63 |
| Xylene | 216.93 |
| Byk 300 | 2.50 |
| 20% N-Methylimidazole/Methyl Isobutyl Ketone | 27.68 |
| 20% Tinuvin 328/Toluene | 23.10 |
| Tinuvin 292 | 2.77 |

This coating formulation represents approximately 1 hydroxyl group per 2 epoxy groups per 2 anhydride groups. The N-Methylimidazole catalyst was present at 3.5% based on anhydride solids. This coating was reduced with suitable solvents and spray applied over a basecoat/primer system coated on Bonderite-1000 panels (iron phosphate treatment on cold rolled steel). This coating system was allowed to cure 24 hours under ambient conditions prior to testing.

The cured coating formulation showed slightly more color than the coating formulation of Example 31. The cured film of this Example exhibited a Konig Pendulum Hardness of 10 after one day, 25 after one week and 38 after four weeks.

EXAMPLE 33

A clear coating was prepared using the same formulation as in Example 32 except that the anhydride resin of Example 13 and the hydroxyl resin of Example 30 were used. The anhydride-functional vehicle showed a more yellow color than that of Example 32. The coating was reduced with suitable solvents and spray applied over a basecoat/primer system on iron phosphate treated cold rolled steel and allowed to ambient cure 24 hours before testing.

The resultant film exhibited a Konig Pendulum Hardness of 8 after one day, 27 after one week and 45 after four weeks, and exhibited excellent 20° gloss and distinctness of image.

EXAMPLE 34

A clear coating was prepared as follows:

| Ingredients | Parts By Weight |
| --- | --- |
| Hydroxy-Functional Polymer (Example 30) | 21.27 |
| Anhydride-Functional Polymer (Example 27) | 28.17 |
| ERL 4299 | 6.49 |
| Xylene | 21.95 |
| Byk 300 | 0.25 |
| 20% N-Methylimidazole/Methyl Isobutyl Ketone | 2.78 |
| 20% Tinuvin 328/Toluene | 2.32 |
| Tinuvin 292 | 0.28 |

This coating formulation represents approximately 1 hydroxyl group per 2 epoxy groups per 2 anhydride groups. The N-Methylimidazole catalyst was present at 3.5% based on anhydride solids. This coating was reduced with suitable solvents and spray applied over a basecoat/primer system coated on Bonderite-1000 panels (iron phosphate treatment on cold rolled steel). This coating system was allowed to cure 24 hours under ambient conditions prior to testing.

This coating formulation showed less color development in the anhydride-functional polymer than in Example 33. The coating exhibited 1 day and 2 weeks Konig Pendulum Hardness readings of 9 and 42.

EXAMPLE 35

A clear coating was prepared as follows:

| Ingredients | Parts By Weight |
| --- | --- |
| Hydroxy-Functional Polymer (Example 30) | 213.84 |
| Anhydride-Functional Polymer (Example 28) | 259.41 |
| ERL 4299 | 64.38 |
| n-Butyl Acetate | 221.37 |
| Byk 300 | 2.50 |
| 20% N-Methylimidazole/Methyl Isobutyl Ketone | 27.60 |
| 20% Tinuvin 328/Toluene | 23.01 |
| Tinuvin 292 | 2.76 |

This coating formulation represents approximately 1 hydroxyl group per 2 epoxy groups per 2 anhydride groups. The N-Methylimidazole catalyst was present at 3.5% based on anhydride solids. This coating was reduced with suitable solvents and spray applied over a basecoat/primer system coated on Bonderite-1000 panels (iron phosphate treatment on cold rolled steel).

The anhydride-functional polymer of this Example corresponds to replacing a small portion of MMA from a high acrylate-anhydride resin (Example 13) with 8.78% methacrylic acid (Example 28) and results in a coating showing improved (less) color, a longer gel time (>12 hours versus approximately 4 hours) and improved gasohol resistance and distinctness of image when compared to the coating of Example 33.

While this invention has been described by a specific number of embodiments, it is obvious that other variations and modifications may be made without departing from the spirit and scope of the invention as set forth in the appended claims.

The invention claimed is:

1. In a substrate coated with a multi-layer decorative and/or protective coating which comprises:
   (a) a basecoat comprising a pigmented film-forming polymer; and
   (b) a transparent clearcoat comprising a film-forming polymer applied to the surface of the basecoat composition; the improvement which comprises utilizing as the clearcoat and/or the basecoat a multicomponent curable composition which is reactive upon mixing of the components, wherein the curable composition comprises:
   (i) an anhydride-functional polymer having an average of at least two cyclic carboxylic acid anhydride groups per molecule and wherein the anhydride-functional polymer is the addition polymerization reaction product of (a) 5 to about 40 weight percent of an ethylenically unsaturated monoanhydride monomer; and (b) 1 to about 15 weight percent of an ethylenically unsaturated carboxylic acid monomer copolymerizable with the ethylenically unsaturated monoanhydride monomer; and (c) 45 to about 94 weight percent of at least one ethylenically unsaturated monomer which is copolymerizable with the ethylenically unsaturated monoanhydride and ethylenically unsaturated acid; and
   (ii) an epoxy-functional compound having an average of at least two cycloaliphatic epoxy groups per molecule; and
   (iii) a hydroxy-functional polymer having an average of at least two hydroxyl groups per molecule and comprising the addition polymerization reaction product of (a) 10 to about 40 weight percent of a hydroxy-functional ethylenically unsaturated monomer and (b) 60 to about 90 weight percent of at least one ethylenically unsaturated monomer copolymerizable with the hydroxy-functional monomer.

2. The coated substrate of claim 1 further characterized in that the ethylenically unsaturated monoanhydride monomers and the ethylenically unsaturated acid monomers and the ethylenically unsaturated copolymerizable monomers comprise 0 to about 10 weight percent of the total monomer mixture of acrylate monomers.

3. The coated substrate of claim 1 further characterized in that the ethylenically unsaturated monoanhydride monomers and the ethylenically unsaturated acid monomers and the ethylenically unsaturated copolymerizable monomers are substantially free of acrylate functionality.

* * * * *